United States Patent
Foursa et al.

(10) Patent No.: US 6,721,091 B2
(45) Date of Patent: Apr. 13, 2004

(54) SYSTEM AND METHOD FOR CONTROLLING OPTICAL AMPLIFIER PUMPS

(75) Inventors: Dmitri Foursa, Freehold, NJ (US); Morten Nissov, Ocean, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 10/171,320

(22) Filed: Jun. 13, 2002

(65) Prior Publication Data

US 2003/0231377 A1 Dec. 18, 2003

(51) Int. Cl.[7] .......................... H04B 10/12; G02B 6/28; H01S 3/30
(52) U.S. Cl. ................ 359/341.43; 359/341.42; 372/3; 372/70
(58) Field of Search ............... 359/334, 341.42, 359/341.43, 341.44; 372/3, 70

(56) References Cited

U.S. PATENT DOCUMENTS

| | | | | |
|---|---|---|---|---|
| 5,035,481 A | | 7/1991 | Mollenauer | 350/96.16 |
| 6,023,366 A | * | 2/2000 | Kinoshita | 359/341 |
| 6,147,796 A | * | 11/2000 | Nissov et al. | 359/341 |
| 6,151,148 A | * | 11/2000 | Harano | 359/174 |
| 6,313,940 B1 | * | 11/2001 | Bode et al. | 359/337 |
| 6,441,950 B1 | * | 8/2002 | Chen et al. | 359/334 |
| 6,466,362 B1 | * | 10/2002 | Friedrich | 359/334 |

* cited by examiner

*Primary Examiner*—Nelson Moskowitz

(57) ABSTRACT

A system and method for controlling optical amplifier pumps. A path average intensity detector is provided for detecting a path average intensity for transmitted optical signals. In response to the detected path average intensity or a variation in path average intensity, a pump parameter controller dynamically adjusts at least one pump parameter of at least one amplifier to achieve a desired path average intensity.

15 Claims, 4 Drawing Sheets

US 6,721,091 B2

SYSTEM AND METHOD FOR CONTROLLING OPTICAL AMPLIFIER PUMPS

FIELD OF THE INVENTION

This invention relates in general to optical communication systems, and in particular to a system and method for controlling optical amplifier pumps.

BACKGROUND OF THE INVENTION

Optical communication networks, in particular long-haul networks of lengths greater than 600 kilometers, inevitably suffer from signal attenuation due to variety of factors including scattering, absorption, and bending. To compensate for losses, optical amplifiers are typically placed at regular intervals, e.g. about every 50 kilometers, along the optical transmission path.

Optical amplifiers include rare earth doped fiber amplifiers such as erbium doped fiber amplifiers (EDFAs), Raman amplifiers, and hybrid Raman/EDFA amplifiers. An EDFA operates by passing an optical signal through an erbium-doped fiber segment, and "pumping" the segment with light from another source such as a laser. The pump source excites erbium atoms in the doped segment, which then serves to amplify the optical signal passing through.

In contrast, Raman amplification is more distributed and occurs throughout an optical transmission fiber when it is pumped at an appropriate wavelength or wavelengths. Each Raman amplifier may contain one or more pumps. Gain is achieved over a spectrum of wavelengths longer than the pump wavelength through the process of Stimulated Raman Scattering. The difference between the Raman amplifier pump wavelength and the peak of the associated amplified wavelength spectrum at the longer wavelength is referred to as a "Stokes shift." The Stokes shift for a typical silica fiber is approximately 13 THz.

Hybrid Raman/EDFA amplifiers generally combine the qualities of EDFAs and Raman amplifiers. For example, an EDFA pumped at 980 nm may provide suitable amplification in the conventional C-band of wavelengths from about 1525 nm to about 1565 nm. Combining this EDFA with a Raman amplifier pumped at a longer wavelength of, for example 1495 nm, can provide an effective hybrid Raman/EDFA amplifier that provides gain over a wide continuous 80 nm range of wavelengths from about 1525 nm to 1605 nm. This range encompasses both the C-band (from about 1525 nm to about 1565 nm) and L-band (from about 1565 nm to about 1605 nm).

Such optical amplifiers are components in optical communication systems, especially long-haul networks that utilize wavelength division multiplexed (WDM) or dense wavelength division multiplexed (DWDM) signals. Such WDM and DWDM systems transmit a plurality of information channels, e.g. 256 channels over a range of wavelengths.

When optical amplifiers and other components of an optical communication system are functioning properly there should be little, if any, variation of the signal power spectrum over the range of transmitted wavelengths from the nominal value as measured at the receiver. This nominal power spectrum corresponds to the path average intensity (PAI) that should ideally be equal or consistently flat over a range of transmitted wavelengths. Many problems, including optical amplifier pump power degradation or failure, can lead to unwanted deviations in PAI and associated signal-to-noise ratio (SNR) as measured at the receiver. Such deviations in PAI and SNR negatively affect signal detection and system reliability leading to system performance penalties.

Accordingly, there is a need for a system and method that can detect such deviations in PAI and provide for PAI recovery with minimal impact to the SNR by adjusting optical amplifier pump parameters.

SUMMARY OF THE INVENTION

An optical communication system consistent with the invention includes a transmitter configured to transmit a plurality of optical signals, and a plurality of optical amplifiers for amplifying the optical signals. Each of the amplifiers includes at least one associated pump with at least one adjustable pump parameter. A path average intensity detector is configured to detect a path average intensity for the signals. In response to the detected path average intensity, a pump parameter controller dynamically adjusts at least one of the pump parameters of at least one of the amplifiers to achieve a desired path average intensity.

A method of controlling path average intensity for a range of transmitted wavelengths in an optical communication system comprising a plurality of optical amplifiers consistent with the invention includes: providing a detector for detecting a deviation in path average intensity; and providing a controller for adjusting at least one optical amplifier pump parameter of at least one of said optical amplifiers in response to the deviation to achieve a desired path average intensity.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
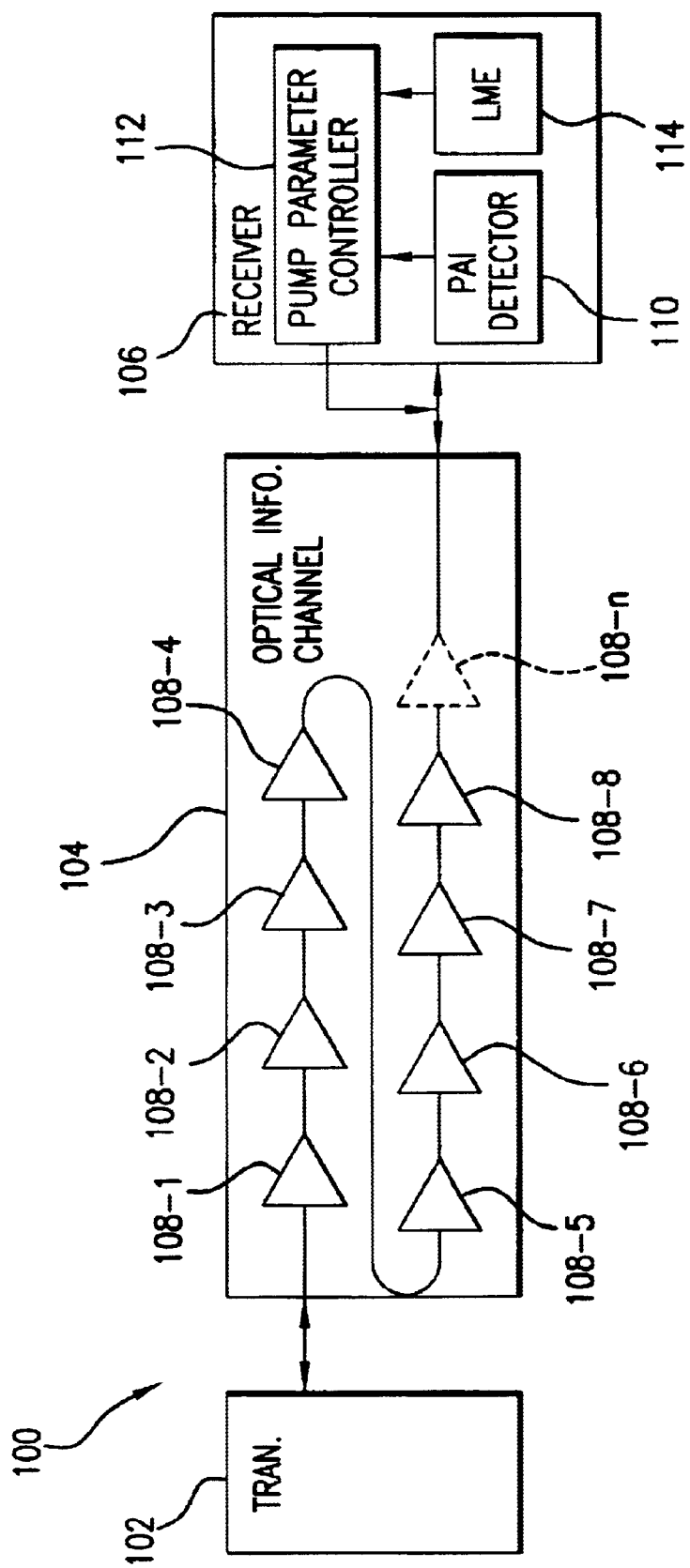
FIG. 1 is a block diagram of an exemplary optical communication system consistent with the present invention.

Turning now to FIG. 1, there is illustrated an exemplary optical communication system 100 consistent with the present invention. Those skilled in the art will recognize that the system 100 has been depicted as a highly simplified point-to-point system for ease of explanation. It is to be understood that the present invention may be incorporated into a wide variety of optical networks, systems, and optical amplifiers without departing from the spirit and scope of the invention.

The optical communication system 100 includes a transmitter 102 and a receiver 106 connected via an optical information channel 104. At the transmitter, data may be modulated on a plurality of wavelengths for transmission over the optical information channel 104. Depending on system characteristics and requirements, the optical information channel 104 may include an optical fiber waveguide, optical amplifiers 108-1, 108-2, 108-3, . . . 108-n, optical filters, dispersion compensating modules, and other active and passive components. A variety of configurations for each of these elements will be known to those skilled in the art.

For clarity, only optical amplifiers 108-1, 108-2, 108-3, . . . 108-n are illustrated in the optical information channel 104. The optical amplifiers may be Raman amplifiers, rare earth doped fiber amplifiers, e.g., EDFAs, and/or hybrid Raman/EDFAs. Each optical amplifier may include one or more pumps depending on the type of amplifier, the range of wavelengths to be amplified, system and reliability requirements, and other factors known to those skilled in the art. As such, the total number of pumps in the system may be greater than or equal to the total number of optical amplifiers in the system. The optical amplifiers may be spaced by a number of kilometers (e.g., 50 kilometers) depending on system characteristics and requirements.

Advantageously, to provide improved signal quality in case of any deviation in PAI the optical amplifiers 108-1, 108-2, 108-3, . . . 108-n may be controlled by a pump management system consistent with the invention. In the illustrated exemplary embodiment, the pump management system includes a PAI detector 110 provided at the receiver 106 for detecting the PAI over a transmitted range of wavelengths. Since variations in PAI may result from complete or partial failure of one or more amplifiers in the information channel, line monitoring equipment (LME) 114 may be provided for generating status information concerning the operational state of the amplifiers.

In response to the PAI detected by detector 110 and, optionally, amplifier status information provided by the LME 114, a pump parameter controller 112 may provide output signals for causing dynamic adjustment of one or more individual amplifier pump parameters for achieving a desired PAI in a manner to be described in greater detail below. If, for example, the PAI deviation is associated with amplifier failure, as indicated by the LME 114, the pumps selected for adjustment by the controller may be associated with amplifiers following the failed pump. It is also possible, however, to initiate adjustments to pumps preceding the failed pump.

Those skilled in the art will recognize a variety of ways that PAI data or deviations in PAI may be detected. For example, detector 110 may include optical power monitors and/or a spectrum analyzer for sensing the relative spectral power density of the transmitted wavelengths to provide readings indicative of the PAI based on known transmitted power levels. In addition, it is to be understood that the PAI detector may be provided in elements other than the receiver, e.g. in an optical amplifier. Deviations in PAI from a nominal value may also be detected by SNR or signal spectrum measurements at the receiver. A variety of configurations for LME are also well known. For example, high loss loop-back paths may be provided for monitoring amplifier operation or a command control supervisory channel may be used to feed terminal equipment with information on the status of the repeater pumps and/or PAI measurements and/or PAI variations Various methods of controlling pump parameters in response to PAI deviations are also known to those skilled in the art. For example, the pump parameter controller 112 may be configured as a microprocessor for providing pump control signals to individual pumps to achieve a desired PAI in response to the detected PAI. The desired PAI, e.g. a substantially constant PAI across the range of transmitted wavelengths, may be stored in the controller for comparison against the signal associated with detected PAI. The controller 112 may iteratively adjust selected pumps until the detected signal is optimized to the desired value, or use one of a plurality of pre-stored adjustment schemes corresponding to a particular condition or failure. One solution could include only the PAI detector and a pre-stored pump adjustment scheme. The command for an adjustment could be generated either by the terminal equipment or by the repeater itself. "Smart" repeaters that communicate with each other and select the desired pump adjustment could also be implemented. This could be done with or without feedback from the terminal equipment.

In general, a pump management system consistent with the invention monitors the PAI associated signal across a range of transmitted wavelengths, and, in response to a deviation in PAI, adjusts parameters of one or more pumps to recover the desired PAI as nearly as possible given system constraints. Preferably, PAI recovery is achieved by distributing increased gain for effected wavelengths across a plurality of amplifiers in the system to minimize the effect on system SNR. However, the selection as to which pump parameters to adjust and to what extent they are to be adjusted depends on system constraints, e.g. the number and type of amplifiers in the system, the number of pumps associated with the amplifiers, the operational state of the amplifiers, etc. For example, in a system with a small number of amplifiers, pump parameters may be adjusted aggressively to substantially recover PAI over the number of available amplifiers. Also, the level of pump parameter adjustment is limited by the available range of adjustment. Pump adjustments may also depend on the severity of the failure and how close the failure is to the receiver. For example, a failure may be contained in only one amplifier or may be contained in a plurality of amplifiers. Such plurality of amplifiers may be close together or farther apart. In addition, such failure or failures may occur close to or farther away from the receiver.

An exemplary system consistent with the present invention including one hundred and forty optical amplifiers spaced fifty kilometers apart over a total 7,000-kilometer span in a WDM 256 channel system. This exemplary system includes a plurality of hybrid Raman/EDFA amplifiers for providing gain over a wide range of wavelengths spanning both the C and L-band from about 1527 nm to 1607 nm. A command control channel is used to provide terminal equipment with the information on the status of the pumps in amplifiers. At the same time it transmits pump adjustment commands from terminal equipment to the repeaters. PAI and PAI variations may be monitored at the receiver. Construction and operation of this exemplary system is discussed for illustration purposes only and, therefore, it is to be understood that the present invention is not limited to the exemplary system or any other exemplary embodiments described herein.

Figure 2:
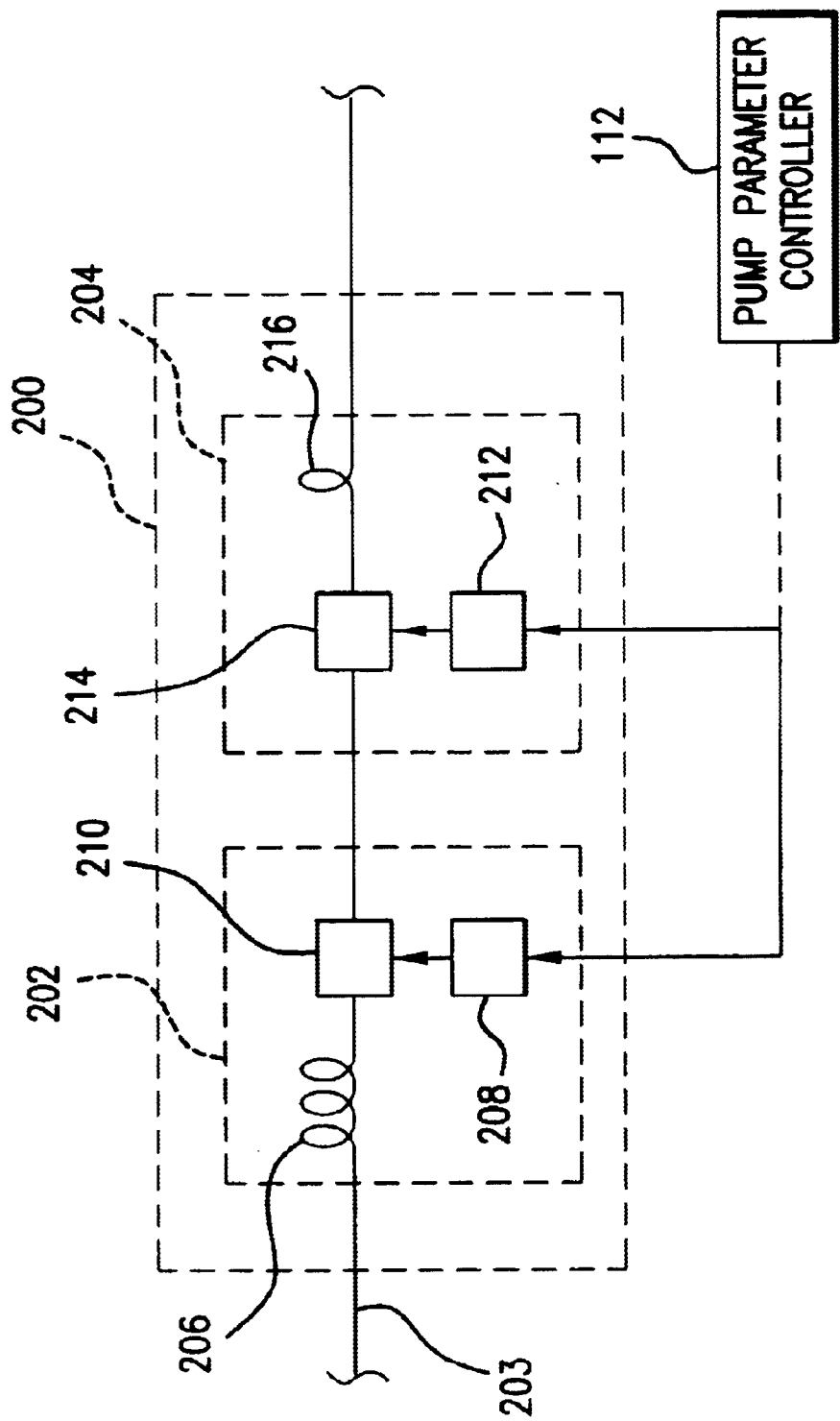
FIG. 2 is block diagram of an exemplary hybrid Raman/EDFA amplifier.

FIG. 2 illustrates an exemplary hybrid Raman/EDFA amplifier 200 used in the exemplary 7,000-kilometer system. The illustrated hybrid Raman/EDFA amplifier 200 includes a Raman portion 202 and an EDFA portion 204. The Raman portion 202 may include a fiber transmission path segment 206 in which Raman gain is generated for amplifying an optical signal propagating through an optical path 203. Energy from a pump source 208 is coupled to the segment 206 of path 203 by a coupler 210. The exemplary Raman portion illustrates one pump 208 at a wavelength of 1495 nm to generate gain generally in the L-band through the process of Stimulated Raman Scattering. One or a plurality of Raman pump sources 208 may also be coupled to the optical path 203 in a wide variety of configurations known to those skilled in the art.

The EDFA portion 204 of the hybrid Raman/EDFA amplifier 200 may include an EDFA pump source 212, an EDFA coupler 214, and an erbium doped fiber segment 216. The exemplary EDFA pump source 212 may pump the segment 216 at 980 nm to generate gain generally in the C-band of transmitted wavelengths, thereby complementing the gain generated generally in the L-band by the Raman portion 202. The pumps may be coupled to a pump parameter controller 112 in a variety of ways, e.g. through an optical service channel, to allow pump parameter adjustment. Also, those skilled in the art will recognize a variety of EDFA pump sources that may be coupled to the optical path 203 in a wide variety of coupling configurations.

To illustrate a system and method for controlling optical amplifier pumps in accordance with the present invention, a fault condition leading to a deviation in PAI was simulated. The simulated fault condition was a 50% reduction in Raman pump power for the first Raman/EDFA amplifier in the exemplary 7,000-kilometer system. Each Raman/EDFA amplifier may be configured to provide gain in the previously stated 1527 nm–1607 nm range. Those skilled in the art will recognize many fault conditions can lead to deviations in PAI. The simulated fault condition of 50% Raman pump power reduction in the first Raman/EDFA amplifier led to an associated decrease in gain for a longer range of wavelengths between about 1580 nm and 1605 nm. Without use of a pump management system consistent with the present invention, the system gradually recovered from this fault over a span of consecutive optical amplifiers. However, even after a span of ten optical amplifiers, there was still a reduction in signal power in the stated range of short and long wavelengths and an increase of signal power in the middle of the stated range as compared to normal conditions. Accordingly, an associated impact on PAI and SNR was observed which degraded performance of the system across the whole stated bandwidth.

Figure 3:
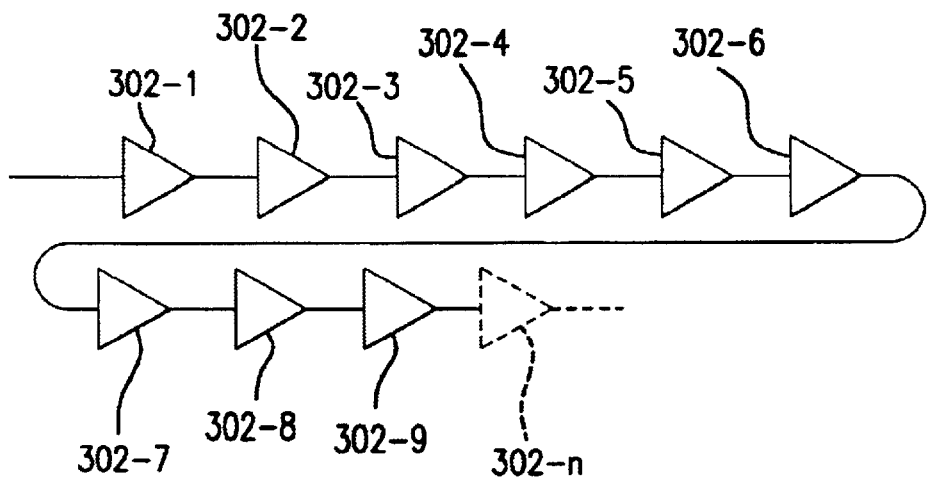
FIG. 3 is an exemplary chain of hybrid Raman/EDFA amplifiers illustrating one exemplary pump management scheme for an exemplary 7,000-kilometer optical communication system.

Advantageously, a system and method consistent with the present invention may adjust pump parameters including pump power and/or wavelength in order to return the PAI to a substantially consistent or flat level with minimal adverse impact on the SNR. Turning to FIG. 3, an exemplary chain of Raman/EDFA amplifiers in the exemplary 7,000-kilometer system helps illustrate the application of a system and method consistent with the present invention. The fault condition of a 50% reduction in Raman pump power in the first Raman/EDFA amplifier 302-1 was simulated.

To offset the gain reduction over the longer range of wavelengths between about 1580 nm and 1605 nm, several pump adjustments are employed. In particular, the Raman pump power of the second Raman/EDFA amplifier 302-2 was adjusted to 10% higher than normal while the EDFA pump power for amplifier 302-2 was maintained at its normal level. Similarly, the Raman pump powers of the third 302-3, fourth 302-4, and fifth Raman/EDFA 302-5 amplifiers were increased to 10% higher than normal, while the EDFA pump powers for each of these amplifiers were maintained at their normal levels. The Raman pump power of the sixth Raman/EDFA amplifier 302-6 was increased to 10% higher than normal and its Erbium pump power was increased to 13% higher than normal. The Raman pump power of the seventh Raman/EDFA amplifier 302-7 was maintained at normal power levels and its Erbium pump was increased to 13% higher than normal. Finally, the Raman pump power of the eighth Raman/EDFA amplifier 302-8 was decreased to 12% lower than normal and its Erbium pump power was increased to 9% higher than normal.

Figure 4:
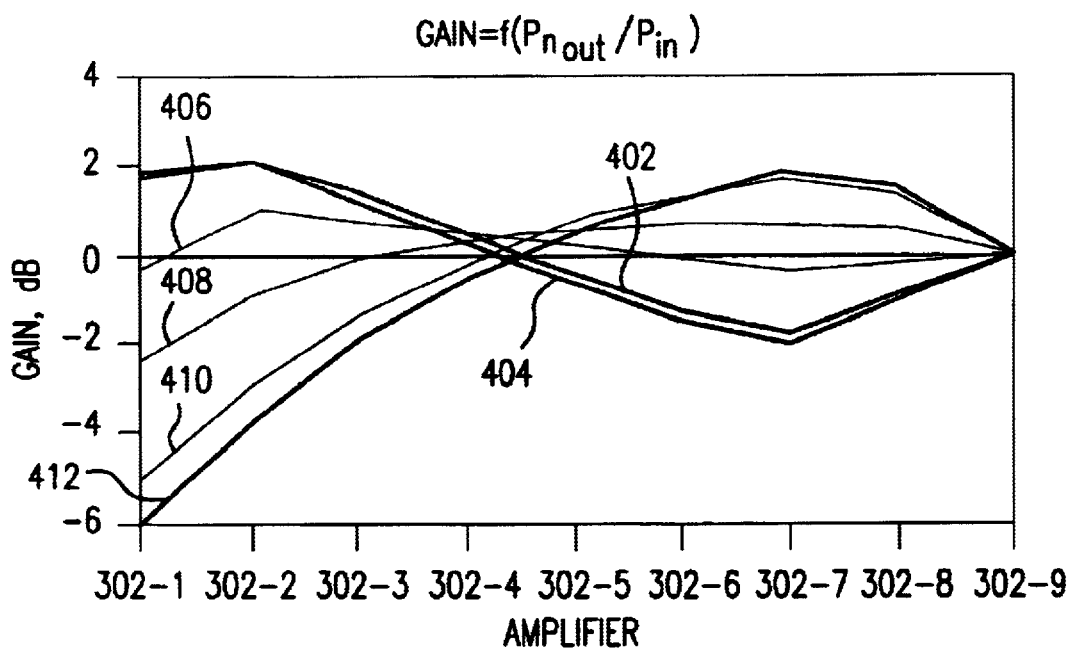
FIG. 4 is an exemplary plot of accumulated gains for a segment of the amplifier chain of FIG. 3 at various wavelengths.

FIG. 4 is an exemplary plot of accumulated gain for a segment of the optical amplifier chain (302-1 . . . 302-9) illustrated in FIG. 3. Each plot represents a different channel. Plot 402 corresponds to the channel at 1527 nm, plot 404 to 1531 nm, plot 406 to 1547 nm, plot 408 to 1567 nm, plot 410 to 1587 nm, and finally plot 412 to 1607 nm. As shown, channels having decreased gain in the first three spans were compensated by increased gain in the following spans and vice versa. For example the channel at 1607 nm illustrated in plot 412 was one of the most adversely impacted by the simulated fault condition (50% reduction in Raman pump power for the first Raman/EDFA amplifier 302-1) compared to the other illustrated channels. The decrease in gain for this channel was corrected by higher Raman pump power in the first six Raman/EDFA amplifiers. Normal Raman pump power levels in the seventh Raman/EDFA amplifier 302-7 and a reduced Raman pump power level in the eighth Raman/EDFA amplifier 302-8 then addressed overcompensation from all the earlier amplifiers which was performed to bring the system PAI to the initial target.

Figure 5:
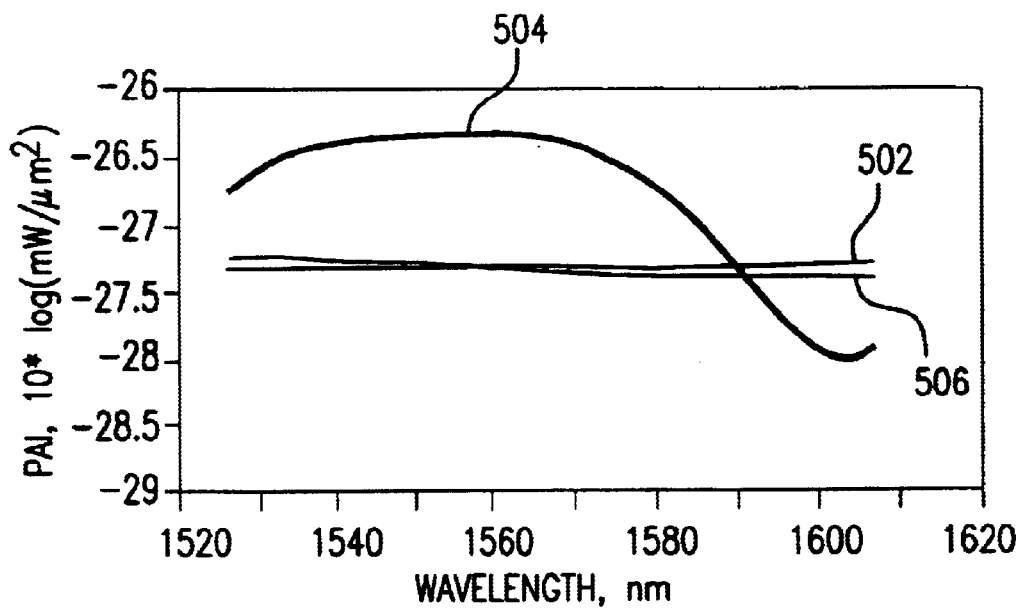
FIG. 5 is an exemplary plot of PAI versus transmitted wavelengths illustrating an improvement in PAI utilizing a system and method of controlling optical amplifier pumps consistent with the present invention.
Figure 6:
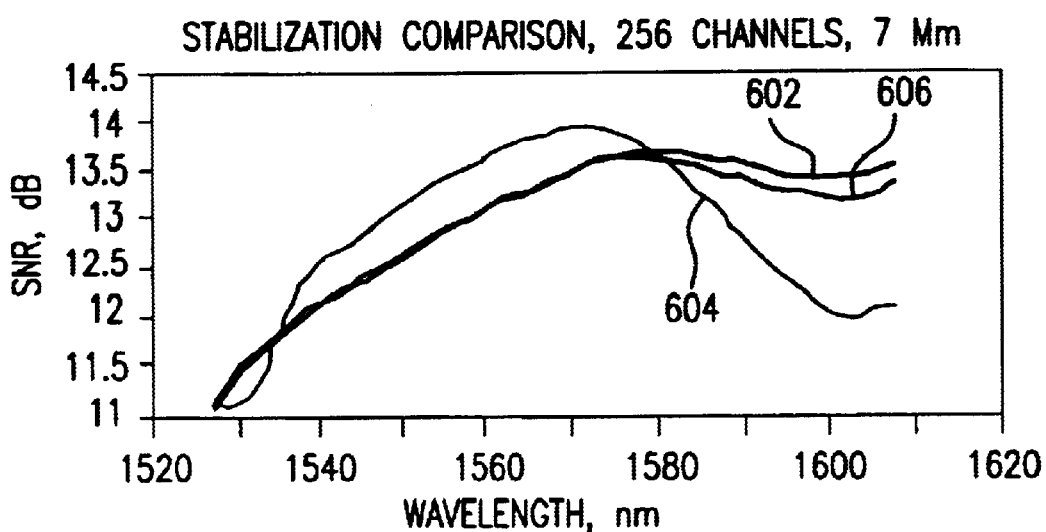
FIG. 6 is an exemplary plot of SNR versus transmitted wavelengths illustrating improvement in the SNR utilizing a system and method of controlling optical amplifier pumps consistent with the present invention.

The results of the exemplary pump power management scheme are illustrated with reference to PAI in FIG. 5 and SNR in FIG. 6. First, under normal operating conditions the PAI ideally has little to no deviation from a constant level across the entire transmitted wavelength range as illustrated by exemplary plot 502. Normal operating conditions assume no fault conditions such as pump failures or degradation that would lead to deviations in PAI. Plot 504 illustrates PAI, as calculated at the receiver, with no pump management scheme for the exemplary 7,000-kilometer system assuming a 50% reduction in Raman pump power for the first Raman/EDFA amplifier. Plot 504 illustrates a substantial deviation in PAI with higher than normal PAI below 1590 nm and lower than PAI above 1590 nm. Such deviations in PAI lead to system instability and system performance degradation.

In contrast, plot 506 illustrates PAI with the same 50% reduction in Raman pump power for the first amplifier, but using the exemplary pump management scheme detailed with reference to FIGS. 3 and 4. As shown, using a pump management scheme consistent with the invention provides a PAI that is nearly flat across the range of wavelengths and is substantially the same as the normal condition PAI illustrated by plot 502. As such, a substantial improvement in PAI can be accomplished with a system and method of controlling pumps consistent with the present invention.

In addition, a minimal impact on SNR can also be accomplished. A "normal" SNR plot 602 in FIG. 6 illustrates the SNR over the transmitted range of wavelengths for the exemplary 7,000-kilometer system under normal conditions. Again, normal conditions assume no fault conditions such as pump failures or degradation that would lead to deviations in PAI. An SNR plot 604 assuming a 50% reduction in Raman pump power for the first Raman/EDFA amplifier illustrates a significant SNR penalty. For example, the SNR penalty may be as high as 1.5 dB in a long range of wavelengths greater than about 1590 nm. In contrast, an exemplary SNR plot 606 illustrates the improvement in SNR achieved through the use of the exemplary pump management scheme detailed with reference to FIGS. 3 and 4. As shown, the prior 1.5 dB SNR penalty may be reduced to only about 0.1 dB.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. An optical communication system comprising:

a transmitter configured to transmit a plurality of optical signals;

an optical transmission path coupled to said transmitter;

a plurality of optical amplifiers, disposed along said transmission path, for amplifying each of said optical signals at least one including Raman, each of said amplifiers comprising at least one associated pump with at least one adjustable pump parameter;

a path average intensity detector optically coupled to said transmission path, said detector configured to detect an average intensity along said optical transmission path for each of said plurality of signals; and a pump parameter controller coupled to said detector, said controller configured to dynamically adjust at least one of said pump parameters of at least one of said amplifiers in response to said average intensity to achieve a desired average intensity along said optical transmission path.

2. The system of claim 1, wherein at least one of said optical amplifiers comprises a hybrid Raman/EDFA amplifier.

3. The system of claim 1, wherein said at least one adjustable pump parameter comprises pump power.

4. The system of claim 1, said system further comprising line monitoring equipment for providing a line monitoring signal representative of an operational state of at least one of said amplifiers, and wherein said pump parameter controller is further configured to adjust said at least one pump parameter in response to said line monitoring signal.

5. The system of claim 1, wherein said pump controller is configured to adjust at least one of said pump parameters of each of said plurality of amplifiers in response to said average intensity.

6. The system of claim 1, wherein said path average intensity detector is configured to detect variations in said average intensity for said plurality of signals, and said pump parameter controller is configured to dynamically adjust at least one of said pump parameters of at least one of said amplifiers in response to said variations to achieve said desired average intensity.

7. An optical amplifier pump management system disposed within an optical communication system for controlling pump parameters for a plurality of optical amplifiers configured to amplify transmitted optical signals on an optical transmission path in said optical communication system, said pump management system comprising:

a path avenge intensity detector configured to detect an average intensity along said optical transmission path for each of said optical signals; and a pump parameter controller coupled to said detector, said controller configured to dynamically adjust at least one of said pump parameters for at least one of said amplifiers in response to said average intensity to achieve a desired average intensity along said optical transmission path.

8. The system of claim 7, wherein said at least one of said optical amplifiers comprises a hybrid Raman/EDFA amplifier.

9. The system of claim 7, wherein said at least one of said pump parameters comprises pump power.

10. The system of claim 7, said system further comprising line monitoring equipment for providing a line monitoring signal representative of an operational state of at least one of said amplifiers, and wherein said pump parameter controller is further configured to adjust said at least one said pump parameters in response to said line monitoring signal.

11. The system of claim 7, wherein said pump controller is configured to adjust at least one of said pump parameters of each of said plurality of amplifiers in response to said average intensity.

12. The system of claim 7 wherein said path average intensity detector is configured to detect variations in said average intensity, and said pump parameter controller is configured to dynamically adjust at least one of said pump parameters of at least one of said amplifiers in response to said variations to achieve said desired average intensity.

13. A method of controlling an average intensity along an optical transmission path for each wavelength in a range of transmitted wavelengths in an optical communication system comprising a plurality of optical amplifiers, said method comprising:

providing a path average intensity detector for detecting a variation in said average intensity along said optical transmission path; and providing a controller for adjusting at least one optical amplifier pump parameter of at least one of said optical amplifiers in response to said variation of said average intensity to achieve a desired average intensity along said optical transmission path.

14. The method in accordance with claim 13, wherein said at least one of said optical amplifiers is a first one of said plurality of said amplifiers, said method flitter comprising the step of:

providing monitoring equipment for detecting a failure of at least a second of said amplifiers, said controller being configured to adjust said at least one optical amplifier pump parameter in response to said failure.

15. The method in accordance with claim 13, wherein said controller is configured to adjust at least one optical amplifier pump parameter for each of said plurality of amplifiers in response to said variation.

* * * * *

UNITED STATES PATENT AND TRADEMARK OFFICE
CERTIFICATE OF CORRECTION

PATENT NO. : 6,721,091 B2
DATED : April 13, 2004
INVENTOR(S) : Dmitri Foursa and Morten Nissov Page 1 of 1

It is certified that error appears in the above-identified patent and that said Letters Patent is hereby corrected as shown below:

Column 6,
Line 2, after the number "302-4," insert -- fifth 302-5, --; after the word "and", delete the word "fifth" and insert the word -- sixth --; and after the word "EDFA", delete "302-5" and insert -- 302-6 --;
Line 6, delete the word "sixth" and insert the word -- seventh --; delete "302-6" and insert -- 302-7 --;
Line 9, delete the word "seventh" and insert the word -- eighth --; delete "302-7" and insert -- 302-8 --;
Line 12, delete the word "eighth" and insert the word -- ninth --; delete "302-8" and insert -- 302-9 --;
Line 30, delete the word "seventh" and insert the word -- eighth --; delete "302-7" and insert -- 302-8 --;
Line 31, delete the word "eighth" and insert the word -- ninth --;
Line 32, delete "302-8" and insert -- 302-9 --;

Column 8,
Line 4, delete the word "avenge" and insert -- average --;
Line 50, please delete the word "flitter" and insert the word -- further --.

Signed and Sealed this

Nineteenth Day of April, 2005

JON W. DUDAS
*Director of the United States Patent and Trademark Office*